UNITED STATES PATENT OFFICE.

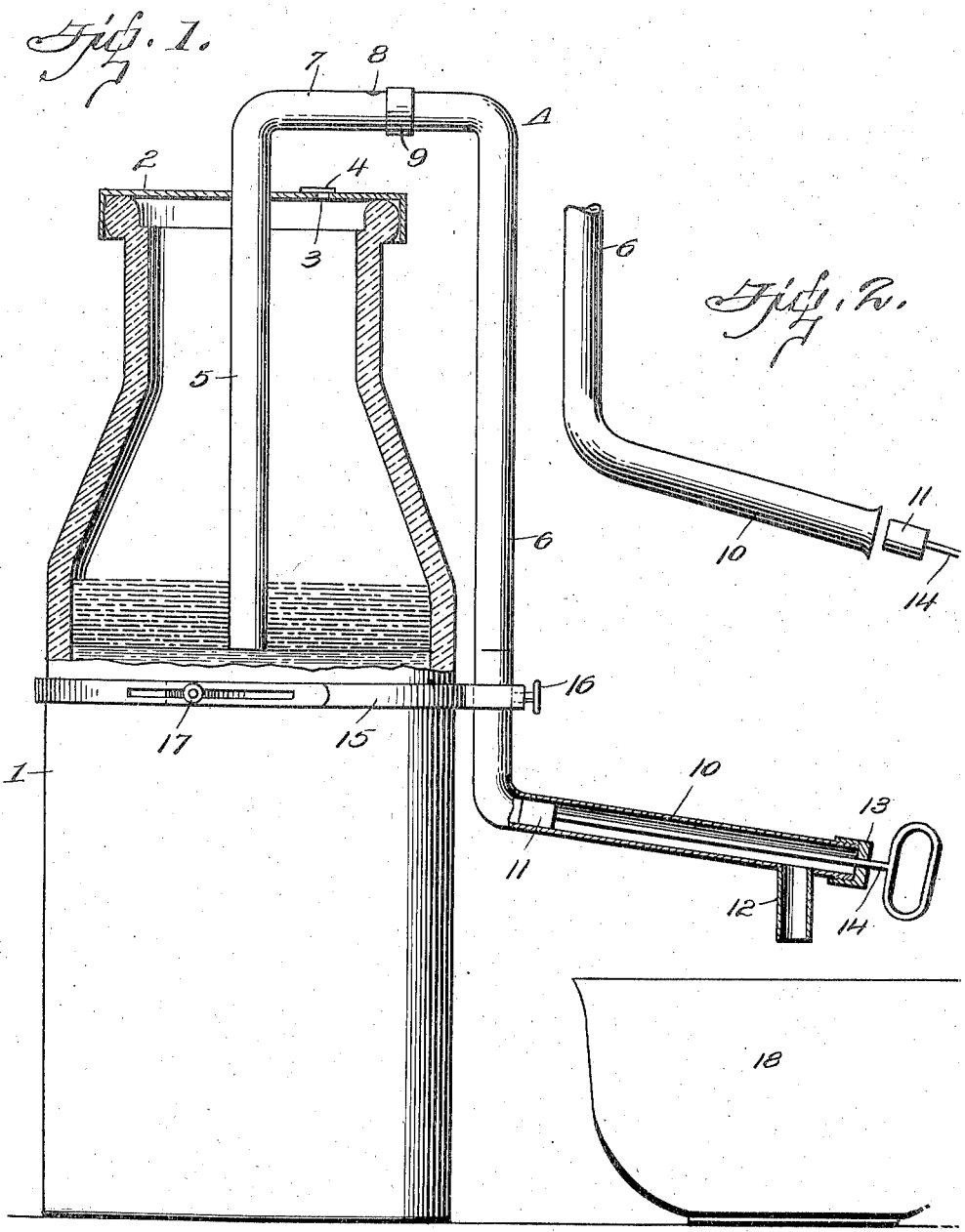

TETSUJI YAMASHITA, OF LOS ANGELES, CALIFORNIA.

SIPHON CREAM-SEPARATOR.

967,099.  Specification of Letters Patent.  Patented Aug. 9, 1910.

Application filed April 15, 1909. Serial No. 490,005.

*To all whom it may concern:*

Be it known that I, TETSUJI YAMASHITA, a citizen of Japan, residing at Los Angeles, in the county of Los Angeles and State of California, have invented new and useful Improvements in Siphon Cream-Separators, of which the following is a specification.

The purpose of this invention is to provide novel means for separating liquids by siphonic action being adapted most especially for drawing off cream from milk.

The invention contemplates a siphon of peculiar construction and novel means coöperating therewith for adjustably connecting the siphon to the receptacle containing the milk or other liquid to be separated, whereby the siphon may be properly adjusted to the line or demarcation separating the liquids of different specific gravities to insure drawing off all the liquid or cream to be separated from the remaining portion.

For a full understanding of the invention reference is to be had to the accompanying drawings and the following description, it being understood that various changes may be resorted to within the scope of the appended claim without departing from the nature of the invention.

Referring to the drawings forming a part of the specifications, Figure 1 is an elevation showing the application of the invention, the upper portion of the receptacle containing the liquid being in section and the discharge portion of the siphon being also in section to show the structural details. Fig. 2 is a detail view of the discharge member of a modified form of siphon.

Corresponding and like parts are referred to in the following description and indicated in all the views in the drawings by the same reference characters.

The numeral 1 designates a milk jar of ordinary formation adapted to contain milk to be separated. It is to be understood however, that the receptacle may be of any capacity and form. A cap 2 is fitted to the upper end of the jar or receptacle 1 and is provided with an opening to receive the intake member of the siphon and with an opening 3 for the admission or outflow of air. The opening 3 may be provided with a closure 4 of any nature to prevent foreign matter from entering the receptacle.

The siphon A comprises an intake member 5 and an outflow member 6, the two members being spaced apart any desired distance and connected at their upper ends by means of a member 7, in the upper side of which is formed an opening 8 for the outflow of air when priming the siphon. The opening 8 may be closed by means of a flexible sleeve 9 of rubber or like material which may be rolled back upon itself to uncover the opening 8 when it is required to provide an outlet for the air confined in the outflow member 6 when moving the piston inward therein. The siphon may be constructed of any material such as glass, vulcanite or the like, glass being preferred as it admits of the working of the siphon being observed and also any matter tending to lodge therein readily discovered so as to be easily removed. The discharge portion 10 of the siphon is straight and extends outwardly and is adapted to receive a piston 11 by means of which the siphon is primed. A nozzle 12 is provided near the discharge end of the part 10. The outer end of the discharge portion 10 is closed by means of a cap 13 which is centrally apertured to receive the rod 14 of the piston 11, said rod being provided at its outer end with a handle for convenience of operation. The piston 11 may be of any construction.

In practice, the siphon is applied to the receptacle 1 containing the liquid to be separated and is retained in place by suitable means. As shown, the intake member 5 passes through the opening of the cap 2 and the outflow member 6 is engaged by means of a holder 15 which encircles the receptacle 1 and is clamped thereto, said holder having an opening to receive the member 6 which is retained in the adjusted position by means of a set screw 16. The holder 15 may be of any construction and consists of a flexible band fitted about the receptacle 1 and having its end portions overlapped and secured by a suitable fastening 17. The siphon may be adjusted vertically to bring the lower end of the intake member 5 in proper position with reference to the line of demarcation between the portions of the liquid to be separated, said siphon being secured in the adjusted position by tightening the set screw 16.

After the siphon has been properly adjusted and secured, the intake member 5 is immersed in the portion of the liquid to be drawn off and the opening 8 is uncovered by rolling or moving the flexible or elastic sleeve 9. The piston 11 is moved within the discharge portion 10, and the air displaced by the piston instead of passing through the siphon and bubbling through the liquid in the receptacle 1, passes out through the opening 8. After the piston has been moved inward to the limit of its stroke, the opening 8 is closed by unrolling or moving the sleeve 9. Upon drawing the piston outward and past the nozzle 12, a suction is created in the siphon which causes the liquid to pass upward into the intake member 5 and downward in the outflow member 6, thereby starting the siphon in the well known manner, the liquid being drawn off from the upper portion of the receptacle 1 by siphonic action in the manner well understood.

The delivery end of the discharge portion 10 of the siphon may be of any construction and as illustrated in Fig. 2 it is devoid of a discharge nozzle and cap, the piston being entirely withdrawn from the part 10 and the liquid flowing outward from the extremity thereof. A vessel 18 may be placed to receive the liquid drawn off during the separating operation.

Having thus described the invention, what is claimed is:—

In combination a receptacle adapted to contain a liquid to be separated, a closure fitted to the open end of the receptacle and having an opening formed therein, means for closing said opening, a siphon having its intake member extending through an opening of said closure and having its outflow member extending along the outer side of the receptacle adjacent thereto and provided with an outwardly extended portion provided near its outer end with a nozzle, the part connecting the upper ends of the inflow and the outflow members having an opening, an elastic band mounted upon the connecting portion of the siphon and adapted to close the opening formed therein, a piston arranged to operate in the outwardly extended portion of the siphon, a holder encircling the receptacle and having its end portions overlapped and adapted to be adjustably connected, said holder having a projecting portion formed with an opening through which the outflow member of the siphon passes, and a set screw for securing the siphon to the holder.

In testimony whereof I affix my signature in presence of two witnesses.

TETSUJI YAMASHITA.

Witnesses:
JOHN W. VAUGHN,
A. H. THOMAS.